(12) United States Patent
Khandhadia et al.

(10) Patent No.: US 7,431,335 B2
(45) Date of Patent: Oct. 7, 2008

(54) PYROTECHNIC STORED GAS INFLATOR

(75) Inventors: Paresh S. Khandhadia, Troy, MI (US); Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 396 days.

(21) Appl. No.: 10/943,458

(22) Filed: Sep. 17, 2004

(65) Prior Publication Data

US 2005/0110253 A1 May 26, 2005

Related U.S. Application Data

(60) Provisional application No. 60/503,577, filed on Sep. 17, 2003.

(51) Int. Cl.
*B60R 21/26* (2006.01)

(52) U.S. Cl. .................... 280/737; 280/741

(58) Field of Classification Search ............. 280/736, 280/737, 740, 741; 102/530, 531, 288
See application file for complete search history.

(56) References Cited

U.S. PATENT DOCUMENTS

| | | | | |
|---|---|---|---|---|
| 3,721,456 A * | 3/1973 | McDonald | .................. | 280/736 |
| 3,930,666 A | 1/1976 | Lynch et al. | | |
| 5,109,772 A * | 5/1992 | Cunningham et al. | .. | 102/275.11 |
| 5,351,989 A | 10/1994 | Popek et al. | | |
| 5,364,127 A | 11/1994 | Cuevas | | |
| 5,516,147 A | 5/1996 | Clark et al. | | |
| 5,588,676 A | 12/1996 | Clark et al. | | |
| 5,593,180 A | 1/1997 | Cuevas et al. | | |
| 5,655,790 A | 8/1997 | Faigle et al. | | |
| 5,664,803 A | 9/1997 | Skanberg et al. | | |
| 5,762,368 A | 6/1998 | Faigle et al. | | |
| 5,868,424 A * | 2/1999 | Hamilton et al. | .......... | 280/741 |
| 5,907,120 A | 5/1999 | Mooney et al. | | |
| 6,007,097 A * | 12/1999 | Rink et al. | ................. | 280/737 |
| 6,155,600 A | 12/2000 | Reynolds et al. | | |
| 6,254,128 B1 | 7/2001 | Albrecht et al. | | |
| 6,296,274 B1 | 10/2001 | Stevens et al. | | |
| 6,368,431 B1 | 4/2002 | Mangum et al. | | |
| 6,488,310 B1 * | 12/2002 | Ryobo et al. | ................ | 280/736 |
| 6,976,704 B2 * | 12/2005 | Lewis et al. | ................. | 280/741 |
| 7,192,055 B2 * | 3/2007 | Stevens et al. | ............. | 280/741 |
| 2001/0045735 A1 * | 11/2001 | Krupp et al. | ................ | 280/741 |
| 2002/0073873 A1 * | 6/2002 | Bley et al. | .................. | 102/530 |
| 2003/0230882 A1 | 12/2003 | Hosey et al. | | |

* cited by examiner

*Primary Examiner*—Ruth Ilan
(74) *Attorney, Agent, or Firm*—L.C. Begin & Associates, PLLC.

(57) ABSTRACT

An inflator for use in an inflatable vehicle occupant protection system. The inflator includes a pressure vessel having an opening formed therein. A quantity of relatively unreactive pressurized gas is stored in the pressure vessel. A quantity of a gas generant composition is positioned in an interior of the pressure vessel and in fluid communication with the pressurized gas. An igniter is positioned proximate the gas generant for initiating combustion of the gas generant. A rupturable, fluid-tight seal is positioned to seal the opening in the pressure vessel for maintaining the pressurized gas within the pressure vessel prior to activation of the igniter. Activation of the igniter results in combustion of the gas generant. Pressure from the combustion gases, in combination with the pressure of the gases stored under pressure in vessel, cause the burst disk to rupture, providing an inflation gas to an associated vehicle airbag, for example.

30 Claims, 3 Drawing Sheets

PYROTECHNIC STORED GAS INFLATOR

CROSS REFERENCE TO RELATED APPLICATIONS

This application claims the benefit of provisional application Ser. No. 60/503,577 filed on Sep. 17, 2003.

BACKGROUND OF THE INVENTION

The present invention relates to gas generators and, more particularly, to a pyrotechnic gas generator containing stored gas for inflating an inflatable vehicle occupant restraint device, such as an air bag.

It is known to use gas generator systems incorporating a stored gas (or "hybrid") inflator to inflate an inflatable vehicle occupant restraint, such as an air bag, to restrain and protect a vehicle occupant in the event of a collision. Typically, such inflators include a container defining a first chamber for storing an inflation gas under high pressure. The container also has an opening through which inflation fluid may flow to inflate the protection device. A first rupturable closure extends across the opening in the container to block fluid flow through the opening. A second chamber is formed either inside the container, or in a manner so as to enable fluid communication between the second chamber and the first chamber. The second chamber contains a quantity of gas generant material. A passage is provided which allows fluid communication between the first and second chambers. A second rupturable closure blocks the passage to restrict fluid communication between the first and second chambers. Upon receiving a signal from a crash sensor algorithm, the gas generant in the second chamber is ignited, producing combustion products which increase pressure in the second chamber to a predetermined level. This causes the second closure to rupture, thereby opening the passage and allowing the combustion products to flow into the first chamber, affecting heating of the inflation fluid stored in the first chamber. This increases pressure in the first chamber, producing rupture of the first closure and allowing the inflation fluid to inflate an inflatable element (for example, an air bag) of the vehicle occupant protection system.

Several concerns exist with the conventional hybrid inflator design described above. The sequence of events, namely ignition of the gas generant, increased pressure in the second chamber, rupture of the second closure to open the passage, propagation of combustion products to the first chamber, heating of the inflation fluid stored in the first chamber, increase of inflation fluid pressure, and rupture of the first closure that are required to inflate the air bag causes unnecessary delay in air bag inflation. In addition, the first and second chambers are typically not in fluid communication unless the gas generant has been ignited, rupturing the second closure. Thus, the gas generant is not exposed to the high pressures produced by the inflation gas stored in the first chamber. Accordingly, the pyrotechnic gas generant chamber must generally be pressurized prior to achieving sustained combustion of the gas generant therein. This typically involves the use of a booster composition that is first ignited by an associated igniter thereby elevating the pressure within the gas generant chamber and thus facilitating sustained combustion of the pyrotechnic gas generant. Another disadvantage with the conventional hybrid inflator design described above is the need for two separate high pressure chambers, one chamber typically housing a pyrotechnic gas generant and the other chamber housing pressurized gas. A design of this type increases the manufacturing complexity and cost of the inflator.

SUMMARY OF THE INVENTION

An inflator is provided for use in an inflatable vehicle occupant protection system. The inflator includes a pressure vessel having an opening therein, a rupturable, fluid-tight seal positioned to seal the opening in the pressure vessel, and a quantity of substantially unreactive pressurized gas stored in the pressure vessel. An igniter is secured to the pressure vessel and upon actuation fluidly communicates with the pressure vessel interior. A perforated gas generant enclosure is positioned in the interior of the pressure vessel and extends along a central axis of the pressure vessel from the igniter to an opposite end.

The enclosure defines an interior cavity and is substantially coextensive with the pressure vessel. Further, the enclosure has a first end and a second end wherein each end is fixed to corresponding ends of the pressure vessel. Fixing the enclosure at each end of the pressure vessel thus provides a substantially stronger structure not only in the perforated enclosure, but also within the pressure vessel in general. The first end of the enclosure is positioned to enable fluid communication between the igniter and the interior cavity. The second end of the enclosure abuts the seal.

The perforated enclosure preferably, although not necessarily, has a plurality of apertures substantially evenly-spaced along a length thereof to enable fluid and uniform communication between the pressurized gas and the interior cavity. A gas generant bed is contained in the enclosure interior cavity and extends along the length of the enclosure. In a preferred embodiment, the gas generant may contain silicone as a fuel, and an oxidizer selected from the group consisting of metal and nonmetal perchlorates. If desired, the gas generant may also include a coolant selected from the group consisting of alkali, alkaline earth, and transitional metal carbonates, bicarbonates, oxalates, and hydroxides. It has been found that gas generant compositions incorporating silicone as a fuel generally improve the overall combustion propagation over the length of the perforated enclosure.

Also provided is a method for manufacturing an inflator. The method comprises the steps of providing a pressure vessel having a first end and a second end, and having an opening at the second end; providing an igniter for igniting a gas generant composition at the first end; providing a rupturable, fluid-tight seal for sealing the opening in the pressure vessel; providing a perforated gas generant enclosure defining an interior cavity and having a first end and a second end wherein the enclosure is substantially coextensive with the pressure vessel; the enclosure may preferably be formed with a plurality of apertures substantially evenly-spaced along a length thereof to enable fluid communication between the pressurized gas and the interior cavity; providing a quantity of a solid gas generant composition; securing the igniter to the pressure vessel so that the igniter operably communicates with an interior of the pressure vessel and with an exterior of the pressure vessel; positioning the quantity of gas generant composition in the interior cavity of the enclosure along the length of the enclosure; positioning the gas generant enclosure in the interior of the pressure vessel to extend along a central axis of the pressure vessel; securing the first end of the enclosure in a position enabling fluid communication between the igniter and the enclosure interior cavity; securing the second end of the enclosure in a position abutting the seal; filling the pressure vessel with a quantity of high-pressure, substantially unreactive gas; and sealing the pressure vessel, whereby the apertures in the enclosure enable fluid communication between the gas generant in the enclosure interior cavity and the pressurized gas exterior of the enclosure. Accordingly, the method described above results in a high pressure environment not only within the pressure vessel, but also within the gas generant enclosure during normal operation of the vehicle whereby relatively accelerated ignition and combustion of the solid gas generant is achieved when compared to a two-chamber hybrid inflator for example.

Also provided is a gas generating system comprising a gas generator for generating gas, a pressure vessel within the gas generator, a substantially unreactive pressurized gas within the pressure vessel, at least one gas exit orifice formed in the pressure vessel for release of the pressurized gas, a rupturable seal for sealing the orifice in the pressure vessel, a gas generant enclosure within the gas generator fixed to a first and a second end of the pressure vessel, and a gas generant within the gas generant enclosure combustible to produce hot combustion products that fluidly communicate with the pressurized gas. The gas generating system may for example be otherwise defined, such as a vehicle occupant protection system wherein the vehicle occupant protection system if manufactured as known in the art. Accordingly, the vehicle occupant protection system includes an airbag, a hybrid gas generator in accordance with the present invention, a crash sensor in electronic communication with the gas generator for actuation thereof, all manufactured as known in the art.

DETAILED DESCRIPTION

Figure 1:
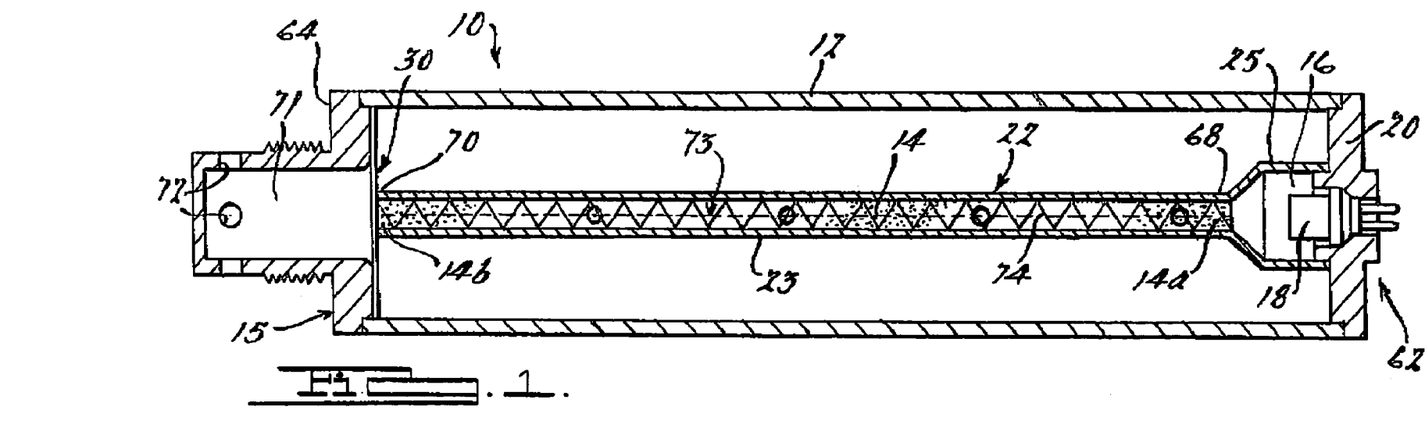
FIG. 1 is a cross-sectional side view of a pyrotechnic stored gas inflator in accordance with the present invention.
Figures 4, 5, 6:
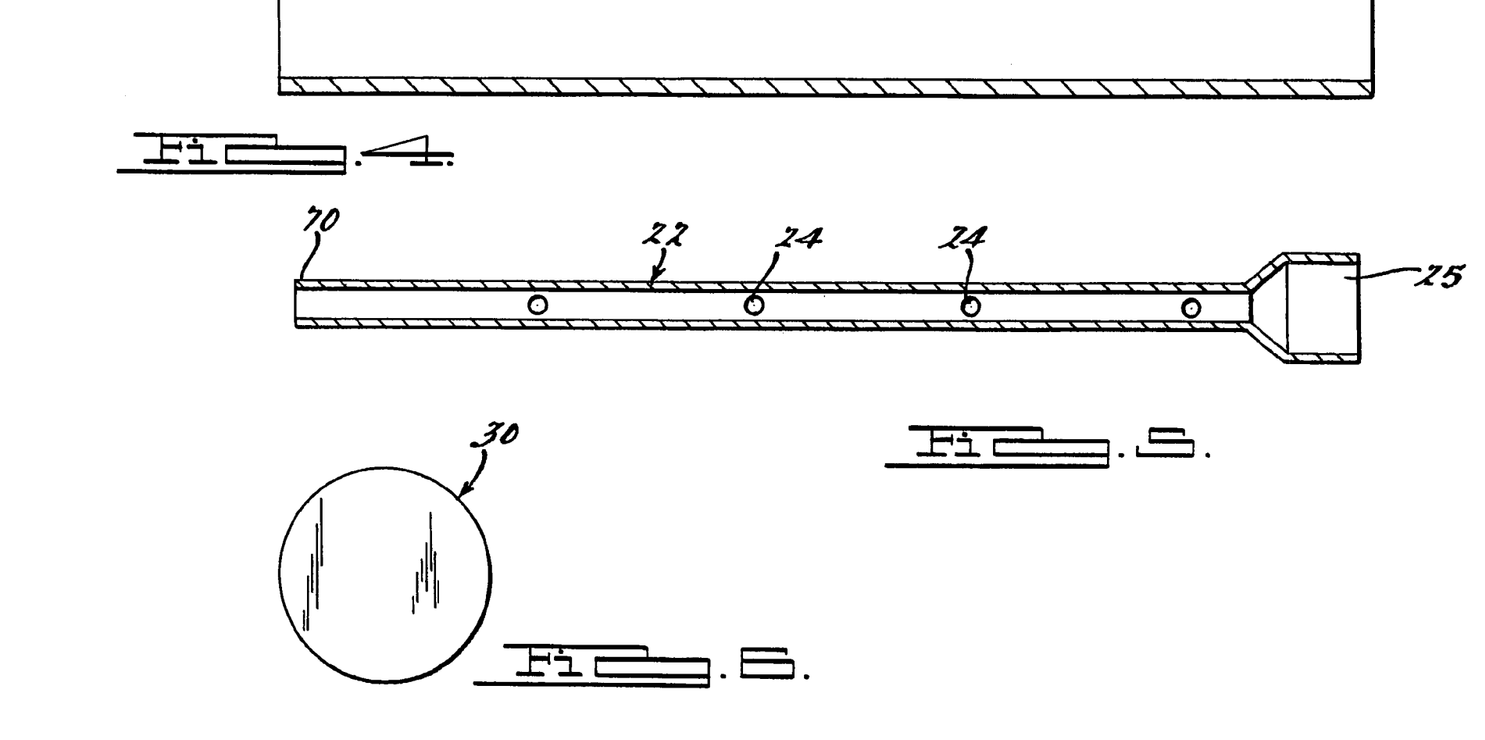
FIG. 4 is a cross-sectional view and an end view of a pressure vessel incorporated into the inflator of FIG. 1.
FIG. 5 is a cross-sectional view and end views of a gas generant enclosure coupled to an igniter enclosing cup, as shown in the inflator of FIG. 1.
FIG. 6 is a side-elevational view and an edge view of a burst disk incorporated into the inflator of FIG. 1.

FIG. 1 shows one embodiment of a stored gas inflator 10 in accordance with the present invention. Inflator 10 includes a pressure vessel 12 having a first end 62 and a second end 64. Referring to FIGS. 1 and 4, a first embodiment includes an elongate vessel 12 having a substantially cylindrical metallic inflator body. It should be appreciated, however, that alternative inflator body types and designs may be used without departing from the scope of the present invention. Vessel 12 has a longitudinal central axis A and an opening 60 formed at one end of vessel 12. The pressure vessel may be stamped, extruded, die cast, or otherwise metal formed and may be made from carbon steel or stainless steel, for example.

Figure 3:
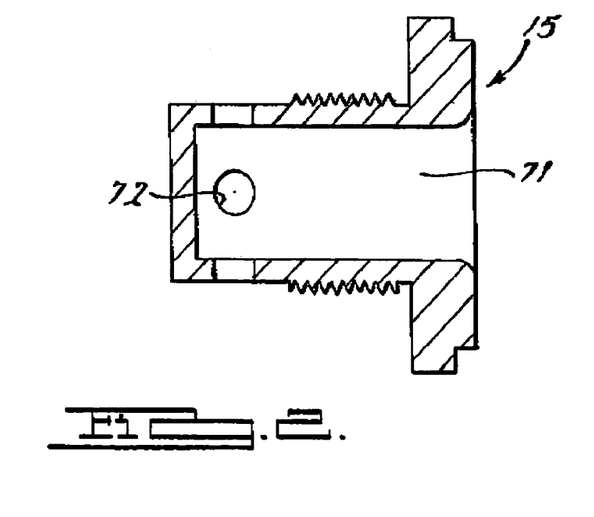
FIG. 3 is a cross-sectional view and end views of an igniter assembly incorporated into the inflator of FIG. 1.

An igniter 18 is secured to the pressure vessel 12 such that the igniter 18 is in ignitable or operable communication with an interior of the pressure vessel 12. In the embodiment shown, an igniter cap assembly 16 (also illustrated in FIG. 3) includes the igniter 18 and a cap 20. Igniter cap assembly 16 is positioned along central axis A to seal an opening provided in pressure vessel 12. Igniter 18 may be formed as known in the art. An exemplary igniter construction is described in U.S. Pat. No. 6,009,809, herein incorporated by reference. Cap 20 may be stamped, extruded, die cast, or otherwise metal formed and may be made from carbon steel or stainless steel, for example. Cap 20 may be welded and/or crimped or otherwise fixed to pressure vessel 12 in a manner sufficient to ensure a gas tight seal between cap 20 and vessel 12.

Referring again to FIG. 1, a perforated gas generant enclosure 22 is provided for containment of a gas generant composition 48, and for facilitating relatively quicker propagation of the gas generant combustion 48 across the length of the pressure vessel 12. FIG. 5 shows a detailed view of the gas generant enclosure 22 seen in FIG. 1. Enclosure 22 has an elongate, substantially cylindrical body 23 defining a first end 68, a second end 70, and an interior cavity 73 for containing gas generant 14 therein. Enclosure 22 also includes a plurality of apertures 24 preferably, but not necessarily, substantially evenly-spaced along a length thereof to enable uniform fluid communication between pressurized gas stored in vessel 12 and the enclosure interior cavity. Apertures 24 may vary in number or design from those shown in FIGS. 1 and 5. The gas generant tube 22 may for example, be roll formed from sheet metal and then perforated.

Enclosure 22 is positioned within vessel 12 to extend along central axis A of the pressure vessel. First end 68 is positioned to enable fluid communication between the igniter 18 and the interior cavity 72 of the enclosure 22. A rupturable seal 30, described below, is fixed adjacent the second end 70 thereby forming a gas tight seal at the vessel opening 60.

Referring again to FIG. 1, a quantity of a gas generant composition 14 is positioned in the interior cavity of gas generant enclosure 22. Gas generant 14 is encased within the open or perforated enclosure 22 is in constant fluid communication with the pressurized gas within pressure vessel 12. In the embodiment shown in FIG. 1, gas generant 14 is formed as an elongate strand having a first end 14a and a second end 14b. Strand 14 extends longitudinally along a length of enclosure 22 and pressure vessel 12. First end 14a of strand 14 is positioned at first end 68 of enclosure 22 thereby operably communicating with igniter 18. Strand second end 14b is positioned adjacent the seal 30 thereby facilitating gas generation across the inner length of the pressure vessel 12. In the embodiment shown in FIG. 1, the contiguous outer surface area of propellant strand 14 facilitates a relatively rapid combustion propagation of strand 14 across the length of the propellant strand 14.

Suitable gas generant compositions are disclosed, for example, in Applicant's co-pending U.S. patent application Ser. No. 09/664,130, incorporated herein by reference. Other suitable gas generants include, but are not limited to, those described in U.S. Pat. Nos. 5,035,757, 6,210,505, and 5,872, 329, also incorporated herein by reference in their entirety. In general, any known pyrotechnic gas generant, in any form, recognized for its utility within a vehicle occupant protection system, for example, may be employed within the pressure vessel 12.

Because the solid gas generant is contained within pressure vessel 12 and is in continuous fluid contact or communication with the high pressure gas, optimum combustion conditions are immediately available upon ignition of the gas generant. Under these conditions, it has been found that solid gas generants that burn efficiently at ambient pressures will exhibit even greater burn rates at the relatively high pressures within the pressure vessel. For this reason, these gas generants may be particularly suitable for achieving the rapid gas generant burn rates desired in the present invention.

Stated another way, a group of gas generants employing silicone as a fuel are believed to be particularly suitable for use in the present invention. These gas generants further comprise an oxidizer selected from the group including metal and nonmetal perchlorates such as potassium perchlorate, lithium perchlorate, and ammonium perchlorate. If desired, these gas generants may further contain a coolant selected from the group including metal carbonates, metal bicarbonates, metal oxalates, and metal hydroxides.

In yet another aspect of the present invention, compositions containing at least one silicone polymer (organosiloxane polymers) as a fuel, and at least one oxidizer combust at ambient pressure at ambient pressure at acceptable combustion temperatures. If desired, these compositions may include at least one coolant component containing a metallic salt and/or base. Because of these compositions propensity to sustain combustion at ambient pressures, the ignitability and combustibility of the same is enhanced when employed in the high pressure environment of the pressurized gas within the pressure vessel 12. Accordingly, the composition of the gas generant also contributes to the relatively quicker combustion reaction as compared to a known multiple or dual chamber hybrid inflator, for example.

Silicone is defined as any of a large group of siloxane polymers based on a structure consisting of alternate silicone and oxygen atoms with various organic radicals (or functional groups) attached to the silicone. Radicals include, but are not limited by the group including methyl, methoxy, and amino.

The term "silicone" as used herein will be understood in its generic sense. Hawley Hawley's Condensed Chemical Dictionary. 12$^{th}$ Edition. Richard J. Lewis. Sr. (1993), describes silicone (organosiloxane) as any of a large group of siloxane polymers based on a structure consisting of alternate silicon and oxygen atoms with various organic radicals attached to the silicon:

Formula 1:

Silicone Example

Or, silicone can be more generically represented as shown in Formula 2:

Formula 2:

Silicone Example

Note, "n" in the Formulas indicates a multiple of the polymeric group or portion of the molecule given within the brackets, to include the organic groups attached to the silicon.

Exemplary silicones include those disclosed in U.S. Pat. Nos. 5,589,662, 5,610,444, and 5,700,532, and, in TECHNOLOGY OF POLYMER COMPOUNDS AND ENERGETIC MATERIALS, Fraunhofer-Institut fur Chemische Technologie (ICT), 1990, each reference and document herein incorporated by reference.

The preferred gas generant compositions of the present invention preferably contain silicone as a fuel. The silicone fuel component is provided at about 10-25% by weight of the gas generant composition. One or more primary oxidizers selected from the group including metal and nonmetal perchlorates are provided. If desired, exemplary secondary oxidizers include but are not limited to phase stabilized ammonium nitrate, ammonium nitrate, potassium nitrate, and strontium nitrate. Stated another way, secondary oxidizers may be selected from the group including metal and nonmetal chlorates, oxides, nitrates, and nitrites, or other well known oxidizers. The total oxidizer component is provided at about 30-85% by weight of the gas generant composition.

If desired, a coolant is selected from the group including metal carbonates, metal oxalates, metal bicarbonates, and metal hydroxides, and is provided at about 1-30% by weight of the gas generant composition. "Metal" is defined as alkali, alkaline earth, and transitional metals. Exemplary coolants include but are not limited to strontium carbonate, magnesium carbonate, calcium carbonate, potassium carbonate, strontium oxalate, and magnesium hydroxide.

In general, the order in which the constituents are added is not critical so long as they are homogeneously blended. Other known wet and dry blending methods may also be used. Once blending is complete, the gas generant constituents may be extruded or formed into specific shapes such as elongated extrusions, pellets, sheets, or granules.

Table 1 exemplifies gas generant compositions particularly suitable for the present invention. As shown in the table, compositions consisting of silicone and a perchlorate oxidizer have rapid and sustained burn rates (at 3000 psi) greater than or equal to one inch per second. These combustion properties have been observed at ambient pressure wherein the burn rate is approximately 0.4 inches per second or greater. Nevertheless, the combustion temperatures are relatively high. See Examples 2 and 3. However, when a coolant such as a metal carbonate is added, the temperatures in certain cases are notably reduced. See Examples 17, 21, and 24, for example.

TABLE 1

| Example | Formulation | Mol gas/ 100 g | Tc @ 3000 psi | Density g/cc | Gas Yield % | Comment |
|---|---|---|---|---|---|---|
| 1 | 82% Sr(NO$_3$)$_2$ 18% Silicone | 1.6 | 2100 | 2.20 | 45.2 | Slow ignition and burning; well-formed slag |
| 2 | 79% KClO$_4$ 21% Silicone | 1.4 | 3182 | 1.90 | 40.8 | Rapid and sustained burn at ambient pressure |
| 3 | 80% KClO$_4$ 20% Silicone | 1.4 | 3130 | 1.93 | 43.4 | Rapid and sustained burn at ambient pressure |
| 4 | 31% KClO$_4$ 19% Silicone 50% Sr(NO$_3$)$_2$ | 1.5 | 2100 | 2.08 | 43.2 | Slower ignition and burning than Ex. 2 and 3; well-formed slag |
| 5 | 30% KClO$_4$ 20% Silicone 50% Sr(NO$_3$)$_2$ | 1.6 | 2100 | 2.05 | 46.7 | Slower ignition and burning than Ex. 2 and 3; well-formed slag |
| 6 | 30% LiClO$_4$ 22% Silicone 48% Sr(NO$_3$)$_2$ | 1.7 | 2222 | 1.98 | 46.7 | Slower ignition and burning than Ex. 2 and 3; well-formed slag |
| 7 | 20% LiClO$_4$ 20% Silicone 60% Sr(NO$_3$)$_2$ | 1.6 | 2099 | 2.07 | 46.4 | Slower ignition and burning than Ex. 2 and 3; well-formed slag |
| 8 | 29% LiClO$_4$ 20% Silicone 40% Sr(NO$_3$)$_2$ 11% NH$_4$NO$_3$ | 1.9 | 2207 | 1.93 | 52.6 | Burn is slower than non-AN* formulas; higher gas yield |
| 9 | 45% LiClO$_4$ 20% Silicone 35% NH$_4$NO$_3$ | 2.6 | 2923 | 1.70 | 65.8 | Burn is slower than non-AN formulas; higher gas yield |
| 10 | 27% LiClO$_4$ 20% Silicone 35% Sr(NO$_3$)$_2$ 18% NH$_4$NO$_3$ | 2.2 | 2379 | 1.88 | 55.9 | Burn is slower than non-AN formulas; higher gas yield |
| 11 | 37% LiClO$_4$ 19% Silicone 44% NH$_4$NO$_3$ | 2.8 | 2841 | 1.67 | 69.8 | Burn is slower than non-AN formulas; higher gas yield |
| 12 | 53% KClO$_4$ 20% Silicone 27% Sr(NO$_3$)$_2$ | 1.5 | 2594 | 2.00 | 42.0 | Slower ignition and burning than Ex. 2 and 3; well-formed slag |
| 13 | 27% LiClO$_4$ 20% Silicone 36% Sr(NO$_3$)$_2$ 17% NH$_4$NO$_3$ | 2.0 | 2000 | 1.93 | 55.4 | Burn is slower than non-AN formulas; higher gas yield but liberates H$_2$ and CO |
| 15 | 58% LiClO$_4$ 20% Silicone 22% Na$_2$CO$_3$ | 1.5 | 3291 | 1.90 | 51.0 | Rapid and sustained burn at ambient pressure |
| 16 | 58% LiClO$_4$ 20% Silicone 22% SrCO$_3$ | 1.5 | 2296 | 2.00 | 47.5 | Rapid and sustained burn at ambient pressure |
| 17 | 58% LiClO$_4$ 20% Silicone 22% CaCO$_3$ | 1.5 | 2100 | 1.95 | 51.8 | Rapid and sustained burn at ambient pressure |
| 18 | 71% LiClO$_4$ 19% Silicone 10% C$_3$H$_6$N$_6$ | 1.9 | 3161 | 1.83 | 56.2 | |
| 19 | 49% KClO$_4$ 21% Silicone 30% Sr(NO$_3$)$_2$ | 1.5 | 2633 | 1.98 | 41.9 | Slower ignition and burning than Ex. 2 and 3; well-formed slag |
| 20 | 20% Silicone 80% NH$_4$NO$_3$ | 3.4 | 3094 | 1.64 | 83.8 | Burn is slower than non-AN formulas; higher gas yield but liberates H$_2$, HCl, CO |
| 21 | 58% LiClO$_4$ 20% Silicone 22% CaC$_2$O$_4$ | 1.6 | 2277 | 1.86 | 53.7 | Rapid and sustained burn at ambient pressure |

TABLE 1-continued

| Example | Formulation | Mol gas/ 100 g | Tc @ 3000 psi | Density g/cc | Gas Yield % | Comment |
|---------|-------------|----------------|---------------|--------------|-------------|---------|
| 22 | 51% LiClO$_4$ 22% Silicone 27% NH$_4$NO$_3$ | 2.4 | 3007 | 1.7 | 61.9 | Burn is slower than non-AN formulas; higher gas yield but liberates H$_2$ and CO |
| 23 | 10% KClO$_4$ 20% Silicone 70% Sr(NO$_3$)$_2$ | 1.6 | 2100 | 2.11 | 55.9 | Slower ignition and burning than Ex. 2 and 3; well-formed slag |
| 24 | 60% KClO$_4$ 20% Silicone 20% SrCO$_3$ | 1.5 | 2363 | 2.03 | 37.5 | Rapid and sustained burn at ambient pressure |

A quantity of relatively unreactive pressurized gas is stored in the interior of pressure vessel 12. As used herein, the term "substantially unreactive" is understood to mean that the pressurized gas stored in pressure vessel 12 is unable to sustain a combustion reaction given an incomplete combustion system. For example, the pressurized gas may be substantially oxygen-free, and may comprise a single substantially unreactive element (such as N$_2$) or a compound formed from two or more such elements, such as N$_2$ and He$_2$. In a particular embodiment, the pressurized gas comprises approximately 95% N$_2$ and approximately 5% He$_2$. Various other gases and gas mixtures or proportions might be used without departing from the scope of the present invention.

The amount of pressurized gas stored in pressure vessel 12 and the quantity of gas generant 14 placed in vessel 12 may be varied to achieve predetermined performance characteristics of inflator 10 upon activation. Table 1 sets forth exemplary ranges of proportions of gas generant 14 to stored pressurized gas.

TABLE 2

| Gas Volume | Mass of Gas Generant-High | Mass of Gas Generant-Low | Mass of Gas Generant-Average |
|------------|---------------------------|--------------------------|------------------------------|
| 6 in$^3$ | 5.0 g | 1.0 g | 2.5 g |
| 12 in$^3$ | 10.0 g | 2.0 g | 5.0 g |
| 24 in$^3$ | 20.0 g | 4.0 g | 10.0 g |

It should be appreciated that the values set forth in Table 1 are exemplary relationships and should not be construed as limiting. Other proportions of gas generant to stored gas may be used to achieve predetermined design and performance objectives. For example, inflation of a smaller airbag or an airbelt may require a relatively smaller quantity of inflation gas than a larger airbag. In this instance, the mass of the gas generant used may be lessened accordingly. Similarly, where a relatively greater quantity of inflation gas is desired, the mass of the gas generant used may be increased accordingly. Alternatively, both the quantity of stored gas and the quantity of gas generant may be adjusted to produce a desired quantity of inflation gas.

A filter may be incorporated into the inflator design for filtering particulates from gases generated by combustion of gas generant 14. In general, the filter is positioned between gas generant 14 and the pressurized gas stored in pressure vessel 12. In one embodiment (not shown), a filter is positioned in the interior cavity of enclosure 22 between gas generant 14 and apertures 24. In another embodiment, a filter 74 is positioned exterior of enclosure 22 intermediate apertures 24 and the bulk of the pressurized gas. In this embodiment, the filter 74 may be either spaced apart from enclosure 22, or the filter may be positioned on an exterior surface of enclosure 22 to receive a flow of combustion gases exiting the enclosure 22 via apertures 24.

The filter 74 may be formed from one of a variety of materials (for example, a carbon fiber mesh or sheet) known in the art for filtering gas generant combustion products. Or, the filter 74 may be supplied from any known supplier such as Wayne Wire Cloth Products, Inc. of Bloomfield Hills, Michigan. A filter sheet may be positioned and secured to line an interior of exterior wall of gas generant enclosure 22. When applied to an exterior surface of the enclosure, the filter sheet should be secured to the exterior surface in a manner sufficient to maintain coverage of apertures 24 in the face of internal pressures generated in enclosure 22 by combustion of the gas generant. For example, the filter sheet may be secured to enclosure 22 by wrapping a wire around the filter sheet covering the enclosure, or by clamping the filter sheet around the enclosure.

Figure 2:
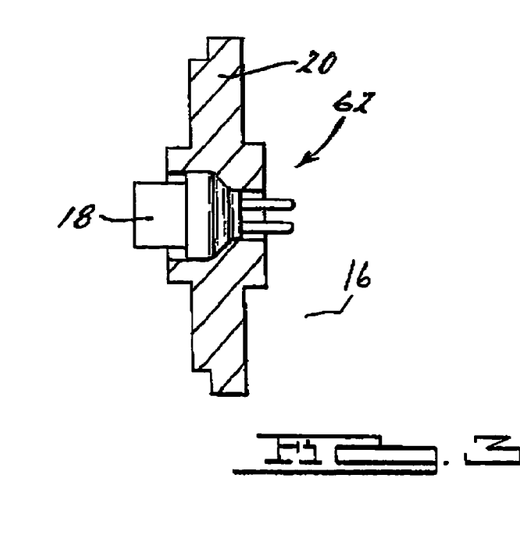
FIG. 2 is a cross-sectional view and end views of a pressure vessel end cap incorporated into the inflator of FIG. 1.

Referring to FIGS. 1 and 2, a cap 15 is positioned to cover opening 60 in pressure vessel 12. Cap 15 defines an interior chamber 71 and has a plurality of circumferentially spaced-apart orifices 72 formed therein to enable fluid communication between interior chamber 71 and an exterior of the cap, and to provide multi-directional diffusion of gases received in the cap interior chamber from the pressure vessel. Cap 15 may be stamped, extruded, die cast, or otherwise metal formed and may be made from carbon steel or stainless steel, for example.

A rupturable, fluid-tight seal in the form of a burst disk 30 is positioned to seal pressure vessel opening 60 for maintaining the pressurized gas within pressure vessel 12. Burst disk 30 is secured to cap 15 proximate gas generant second end 14b thereby preventing fluid flow into chamber 71 during normal operating conditions. Disk 30 forms a fluid-tight barrier between the pressurized gas and interior chamber 71 of cap 15. FIG. 6 shows a detailed view of an exemplary fluid-tight seal suitable for use with the present invention. Various disks, foils, films, etc. may be used to form burst disk 30, depending on the pressure of the gas sealed in vessel 12, and the desired performance characteristics of inflator 10. For example, disks made from materials and/or having structures which are relatively more or less readily ruptured may be used. In addition, as second end 70 of gas generant enclosure 22 abuts disk 30, the disk provides some degree of structural support and positional stability for end 70 of enclosure 22.

Referring to FIGS. 1 and 5, a cup 25 coupled to enclosure 22 may enclose igniter 18 to define a fluid-tight interior portion of the cup 25 in fluid communication with both gas generant 14 and igniter 18 upon gas generator activation. FIG. 5 shows a more detailed view of cup 25 coupled to enclosure 22. Cup 25 is positioned proximate gas generant first end 14a. During activation of inflator 18, cup 25 can accommodate a resident interim gas pressure, facilitating ignition of propellant strand 14. A quantity of booster propellant (not shown) may be positioned in the cup interior portion to facilitate combustion of gas generant 14, in a manner known in the art. As seen in FIGS. 1 and 5, cup 25 is tapered at an end secured positioned proximate gas generant enclosure 22. The tapering functions to channel a flow of combustion products from the igniter 18 to the gas generant upon activation of igniter 18. Cup 25 may be formed integral with gas generant enclosure 22. Cup 25 may be stamped, extruded, die cast, or otherwise metal formed and may be made from carbon steel or stainless steel, for example.

Pressure vessel 12 may be pressurized and sealed using any one of several methods known in the art. One exemplary method of pressurizing and sealing vessel 12 is described in U.S. Pat. No. 6,488,310, which is incorporated herein by reference. Using this method, pressure vessel 12 is charged from a small hole formed in a boss (not shown) formed in one end of the pressure vessel. The hole is then closed using a seal pin or other suitable means.

Upon a crash event, a signal from a crash sensor (not shown) is conveyed to igniter 18, thereby activating the igniter 18 and igniting propellant 14. Cup 25 channels a flow of combustion products from the igniter 18 to the gas generant strand 14 at first end 68 of enclosure 22. Ignition of propellant 14 results in a relatively rapid generation of combustion gases in the interior of enclosure 22. As combustion of propellant strand 14 progresses from first end 14a toward second end 14b, gas exits through the apertures 24 in enclosure 22 into the interior of pressure vessel 12.

In yet another aspect of a preferred embodiment, as the flame front produced by combustion of gas generant 14 quickly propagates from propellant first end 14a toward propellant second end 14b, pressurized gas along the length of the vessel 12 between igniter 18 and seal 30 is exposed to hot combustion products and is substantially uniformly heated given the substantial longitudinal coextension of gas generant enclosure 22 and vessel 12. Accordingly, uniform heating of the gas across the pressure vessel 12 results in a relatively quicker pressure buildup and a more immediate activation of a device, such as an airbag, associated therewith. The increasing pressure from the combustion gases, in combination with the elevated pressure of the heated gas already stored under pressure in vessel 12, causes burst disk 30 to rupture. Stored inflation gas flows then out of vessel 12 into interior chamber 71 of cap 15 and out of at least one gas exit orifice(s) 72 to inflate an associated vehicle airbag.

Because the pyrotechnic gas generant is contained within the high pressure gas pressure vessel and is in continuous fluid contact or communication with the high pressure gas, optimum conditions exist for combustion of the gas generant without delay and immediately upon ignition. Thus, a relatively faster burning rate of gas generant 14 will result than would otherwise ordinarily take place. The high burn rate and temperature of the propellant typically produce a shock wave and a rapid increase in the pressure of the stored gas, rupturing burst disk 30. Accordingly, the amount of time required from ignition/activation of inflator 10 until gas is released and available for inflation of an airbag is minimized. Also, as the gas generant is positioned within the pressure vessel and is exposed to the relatively high stored inflation gas pressure, the use of pyrotechnic gas generants that burn more efficiently at higher pressures is enabled. In addition, the present invention obviates the need for a separate, sealed combustion chamber for the pyrotechnic gas generant. This reduces manufacturing complexity and the cost of the inflator. Furthermore, as stated previously, positioning of the gas generant in the stored inflation gas chamber and exposure of the gas generant to the higher inflation gas pressure enables minimization of the time required to inflate the inflatable elements of the vehicle occupant protection system.

Figure 7:
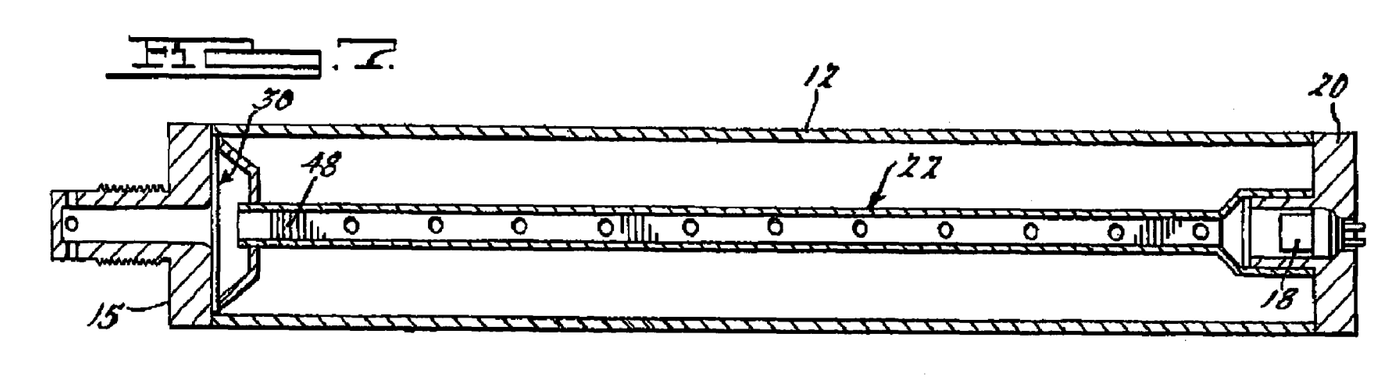
FIG. 7 is a cross-sectional view of a pyrotechnic stored gas inflator including a support member for a second end of the enclosure.

FIG. 7 illustrates an alternate embodiment of the present invention wherein the second end of the enclosure is fixed within a support member 38 adjacent the seal.

Figure 8:
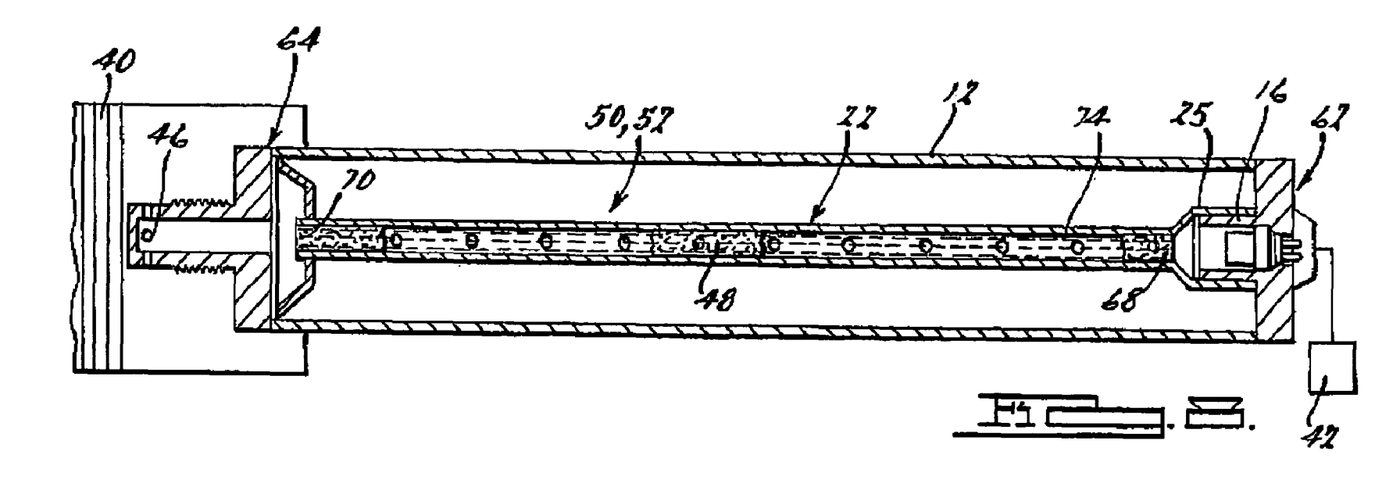
FIG. 8 is a schematic representation of an exemplary gas generating system wherein the gas generating system is a vehicle occupant protection system.

FIG. 8 schematically illustrates an exemplary gas generating system of the present invention wherein the gas generating system is a vehicle occupant protection system including an airbag 40 and a crash sensor package 42 in electronic communication with the igniter 18.

In sum, the present invention may be characterized by the following: a gas generating system 30 containing a sealed pressure vessel 12 containing a first end 62 and a second end 64, the pressure vessel 12 containing pressurized gas 50 at a predetermined pressure 52; a perforated enclosure 22 contained within the pressure vessel 12 is also pressurized at the predetermined pressure 52 given the unsealed perforations of the enclosure 22, wherein the enclosure houses a gas generant 48 suitable for use within an airbag inflator, for example; the perforated enclosure 22 contains a third end 68 fixed proximate to the first end 62 and a fourth end 70 fixed proximate to the second end 64 thereby providing structural reinforcement across the length of the pressure vessel 12 and across the length of the enclosure 22; an igniter assembly 16 is fixed at the first end 62 and operably communicating with the gas generant 48 upon gas generator system activation; if desired the enclosure 22 may be fixed to the igniter assembly 16 as shown in the figures thereby fixing the third end 68 of the enclosure 22 to the first end 62 of the pressure vessel 12; and at least one gas exit orifice 46 is formed in the sealed pressure vessel wherein upon activation of the igniter 18, the sealed pressure vessel 12 is opened to release gases through the gas exit orifice 46.

It should be understood that the preceding discussion should not be construed to limit the present invention and that numerous changes to the disclosed embodiment may be made without departing from the scope of the invention as defined in the appended claims. The preceding description, therefore, is not meant to limit the scope of the invention.

The invention claimed is:

1. An inflator for use in an inflatable vehicle occupant protection system comprising:
   a pressure vessel comprising a first end and a second end, and an opening therein;
   a rupturable seal positioned to seal the opening in the pressure vessel;
   a quantity of substantially unreactive pressurized gas stored in the pressure vessel;
   an igniter secured to the pressure vessel and in fluid communication with an interior of the pressure vessel;
   a perforated gas generant enclosure positioned in the interior of the pressure vessel, the enclosure comprising a length, a third end, a fourth end, and defining an interior cavity, the third end being positioned to enable fluid communication between the igniter and the interior cavity, the fourth end abutting the seal, the perforated enclosure enabling fluid communication between the pressurized gas and the interior cavity, said enclosure remaining at the same pressure as the pressurized gas prior to inflator actuation; and a quantity of a gas generant composition contained in the interior cavity and extending along the length of the enclosure;

wherein upon inflator actuation, said rupturable seal is ruptured by an increase in pressure within the pressure vessel.

2. The inflator of claim 1 further comprising a filter at least partially enclosing the gas generant, for filtering gases generated by combustion of the gas generant 3. The inflator of claim 2 wherein the filter is positioned in the interior cavity of the enclosure intermediate the gas generant and the enclosure, for filtering gases generated by combustion of the gas generant.

4. The inflator of claim 3 wherein the filter is positioned external of the enclosure intermediate the enclosure and at least a portion of the pressurized gas, for filtering gases generated by combustion of the gas generant.

5. The inflator of claim 4 wherein the filter is positioned on an exterior surface of the enclosure.

6. The inflator of claim 1, wherein the gas generant is in the form of an elongate strand having a gas generant first end and a gas generant second end, and the igniter is positioned to enable fluid communication with the first end of the gas generant strand for initiating combustion of the strand.

7. The inflator of claim 1 wherein the pressurized gas is substantially oxygen-free.

8. The inflator of claim 1 wherein the pressurized gas comprises $N_2$.

9. The inflator of claim 1 wherein the pressurized gas comprises a gas formed from $N_2$ and $He_2$.

10. The inflator of claim 9 wherein the pressurized gas comprises approximately 95% $N_2$ and approximately 5% $He_2$.

11. The inflator of claim 1 wherein the ratio of gas generant (in grams) to pressurized gas (in cubic inches) in the pressure vessel is in a range between approximately 1/1.2 and approximately 1/6.

12. The inflator of claim 11 wherein the ratio of gas generant (in grams) to pressurized gas (in cubic inches) in the pressure vessel is approximately 1/2.4.

13. The inflator of claim 1 further comprising a cup enclosing the igniter and coupled to the first end of the enclosure to define a fluid-tight interior portion in communication with both the gas generant and the igniter, far channeling a flow of combustion products from the igniter to the gas generant.

14. The inflator of claim 1 further comprising a cap positioned to cover the opening in the pressure vessel, the cap defining an interior chamber in communication with the fluid-tight seal, the cap having a plurality of circumferentiallly spaced-apart orifices formed therein to enable fluid communication between the cap interior chamber and an exterior of the cap.

15. The inflator of claim 1 wherein the gas generant comprises:
 silicone as a fuel;
 an oxidizer selected from the group consisting of metal and nonmetal perchlorates; and
 an optional coolant selected from the group consisting of alkali, alkaline earth, and transitional metal carbonates, bicarbonates, oxalates, and hydroxides.

16. The inflator of claim 1 wherein the gas generant comprises:
 silicone at 10-25%;
 a primary oxidizer selected from the group consisting of metal and nonmetal perchlorates at 30-85%; and
 a coolant selected from the group consisting of alkali, alkaline earth, and transitional metal carbonates, oxalates, bicarbonates, and hydroxides at 0-30%, said percentages stated by weight of said gas generant composition.

17. An inflator for use in an inflatable vehicle occupant protection system comprising:
 a pressure vessel having an opening therein;
 a rupturable seal positioned to seal the opening in the pressure vessel;
 a quantity of substantially unreactive pressurized gas stored in the pressure vessel;
 an igniter secured to the pressure vessel and in communication with an interior of the pressure vessel;
 a gas generant enclosure positioned in the interior of the pressure vessel along a central axis of the pressure vessel, the enclosure defining an interior cavity and a plurality of apertures along a length thereof to enable fluid communication between the pressurized gas and the interior cavity, the enclosure having an end abutting the seal;
 a quantity of a gas generant composition contained in the enclosure interior cavity and extending along the length of the enclosure, the gas generant composition comprising silicone as a fuel and an oxidizer selected from the group consisting of metal and nonmetal perchlorates.

18. A method for manufacturing an inflator, comprising the steps of:
 providing a pressure vessel having an opening therein;
 providing an igniter for igniting a gas generant composition;
 providing a, fluid-tight seal for sealing the opening in the pressure vessel the seal being rupturable by an increase in pressure within the pressure vessel;
 providing a gas generant enclosure defining an interior cavity and having a first end and a second end, the enclosure also having a plurality of apertures substantially evenly-spaced along a length thereof to enable fluid communication between the pressurized gas and the interior cavity;
 providing a quantity of a solid gas generant composition;
 securing the igniter to the pressure vessel so tat the igniter is in communication with an interior of the pressure vessel and with an exterior of the pressure vessel;
 positioning the quantity of gas generant composition in the interior cavity of the enclosure and extending along the length of the enclosure;
 positioning the gas generant enclosure in the interior of the pressure vessel to extend along a central axis of the pressure vessel;
 securing the first end of the enclosure in a position enabling fluid communication between the igniter and the enclosure interior cavity;
 securing the second end of the enclosure in a position abutting the seal;
 filling the pressure vessel with a quantity of high-pressure, substantially unreactive gas; and
 sealing the pressure vessel, whereby the apertures in the enclosure enable fluid communication between the gas generant in the enclosure interior cavity and the pressurized gas exterior of the enclosure, to pressurize the solid gas generant in the enclosure, thereby facilitating ignition and combustion of the solid gas generant.

19. The method of claim 18 further comprising the step of providing a filter at least partially enclosing the gas generant, for filtering gases generated by combustion of the gas generant.

20. The method of claim 18 further comprising the step of positioning a filter in the interior cavity of the enclosure intermediate the gas generant and the plurality of apertures, for filtering gases generated by combustion of the gas generant.

21. The method of claim 18 further comprising the step of positioning a filter exterior of the enclosure intermediate the plurality of apertures and the pressurized gas, for filtering gases generated by combustion of the gas generant.

22. The method of claim 18 wherein the step of providing a quantity of pressurized unreactive gas to the interior of the pressure vessel comprises providing a gas formed from $N_2$ and $He_2$.

23. The method of claim 18 further comprising the step of providing a cup enclosing the igniter for channeling a flow of combustion products from the igniter to the gas generant, the cup defining an interior portion in communication with both the gas generant and the igniter.

24. The method of claim 23 further comprising the step of positioning a quantity of booster propellant in the cup interior portion to facilitate combustion of the gas generant.

25. An inflator firmed by the method comprising the steps of:
   providing a pressure vessel having an opening therein;
   providing an igniter for igniting a gas generant composition;
   providing a, fluid-tight seal for sealing the opening in the pressure vessel, the seal being rupturable by an increase in pressure within the pressure vessel;
   providing a gas generant enclosure defining an interior cavity and having a flint end and a second end, the enclosure also having a plurality of apertures substantially evenly-spaced along a length thereof to enable fluid communication between the pressurized gas and the interior cavity;
   providing a quantity of a solid gas generant composition;
   securing the igniter to the pressure vessel so that the igniter is in communication with an interior of the pressure vessel and with an exterior of the pressure vessel;
   positioning the quantity of gas generant composition in the interior cavity of the enclosure and extending along the length of the enclosure;
   positioning the gas generant enclosure in the interior of the pressure vessel to extend along a central axis of the pressure vessel;
   securing the first end of the enclosure in a position enabling fluid communication between the igniter and the enclosure interior cavity;
   securing the second end of the enclosure in a position abutting the seal;
   filling the pressure vessel with a quantity of high-pressure, substantially unreactive gas; and
   sealing the pressure vessel, whereby the apertures in the enclosure enable fluid communication between the gas generant in the enclosure interior cavity and the pressurized gas exterior of the enclosure, to pressurize the solid gas generant in the enclosure, thereby facilitating ignition and combustion of the solid gas generant
   wherein said enclosure is maintained at the same pressure as the pressurized gas prior to inflator actuation.

26. A gas generating system comprising:
   a gas generator for generating gas;
   a pressure vessel within the gas generator;
   a substantially unreactive pressurized gas within the pressure vessel
   an orifice formed in the pressure vessel for outflow of the pressurized gas;
   a rupturable seal for sealing the orifice in the pressure vessel;
   a gas generant enclosure within the gas generator and abutting the seal, said enclosure remaining at the same pressure as the pressurized gas; and
   a gas generant within the gas generant enclosure combustible to produce combustion products in communication with the pressurized gas;
   wherein upon inflator actuation, said rupturable seal is ruptured by an increase in pressure within the pressure vessel.

27. The gas generating system of claim 26 wherein the gas generant comprises:
   silicone as a fuel; and
   an oxidizer selected from the group consisting of metal and nonmetal perchlorates.

28. A vehicle occupant protection system comprising the gas generating system of claim 26.

29. A gas generating system comprising:
   a sealed pressure vessel comprising a first end and a second end, said pressure vessel containing pressurized gas at a predetermined pressure, said pressure vessel scaled by a rupturable seal;
   a perforated enclosure contained within said pressure vessel and also pressurized at said predetermined pressure, said perforated enclosure comprising a third end fixed proximate to said first end and a fourth end fixed proximate to said second end and abutting said seal;
   a gas generant suitable for use within an airbag inflator, said gas generant contained within said perforated enclosure;
   an igniter fixed at said first end and operably communicating with said gas generant upon gas generator system activation; and
   at least one gas exit orifice formed in said pressure vessel wherein upon activation of said igniter, said sealed pressure vessel is opened to release gases through said gas exit orifice,
   wherein upon inflator actuation, said rupturable seal is ruptured by an increase in pressure within the pressure vessel.

30. An inflator for use in an inflatable vehicle occupant protection system comprising:
   a pressure vessel comprising a first end and a second end, and an opening therein;
   a rupturable seal positioned to seal the opening in the pressure vessel;
   a quantity of substantially unreactive pressurized gas stored in the pressure vessel;
   an igniter secured to the pressure vessel and in fluid communication with an interior of the pressure vessel;
   a perforated gas generant enclosure positioned in the interior of the pressure vessel, the enclosure comprising a length, a third end, a fourth end, and defining an interior cavity, the third end being positioned to enable fluid communication between the igniter and the interior cavity, the fourth end abutting the seal, the perforated enclosure enabling fluid communication between the pressurized gas and the interior cavity, said enclosure remaining at the same pressure as the pressurized gas prior to inflator actuation; and
   a quantity of a gas generant composition contained in the interior cavity and extending along the length of the enclosure;
   wherein upon inflator actuation, the pressurized gas in the housing is substantially uniformly heated, and wherein the pressure of the heated gas combined with the pressure generated by combustion of the gas generant produces rupture of the seal.

* * * * *

UNITED STATES PATENT AND TRADEMARK OFFICE
CERTIFICATE OF CORRECTION

PATENT NO. : 7,431,335 B2 Page 1 of 1
APPLICATION NO. : 10/943458
DATED : October 7, 2008
INVENTOR(S) : Khandhadia et al.

It is certified that error appears in the above-identified patent and that said Letters Patent is hereby corrected as shown below:

Column 4; Line 41; please delete "72" and insert --73--

Column 5; Line 51; please delete "Hawley"

Column 5; Line 52; Should read: tionary, 12th Edition, Richard J. Lewis, Sr.,

Column 6; Line 56; please insert --use in-- before the present invention

Column 13; Line 45; please delete "far" and insert --for--

Column 13; Line 51; please delete "tiallly" and insert --tially--

Column 14; Line 40; please delete "tat" and insert --that--

Column 15; Line 20; please delete "firmed" and insert --formed--

Column 15; Line 28; please delete "flint" and insert --first--

Signed and Sealed this

Twenty-fifth Day of November, 2008

JON W. DUDAS
*Director of the United States Patent and Trademark Office*